…

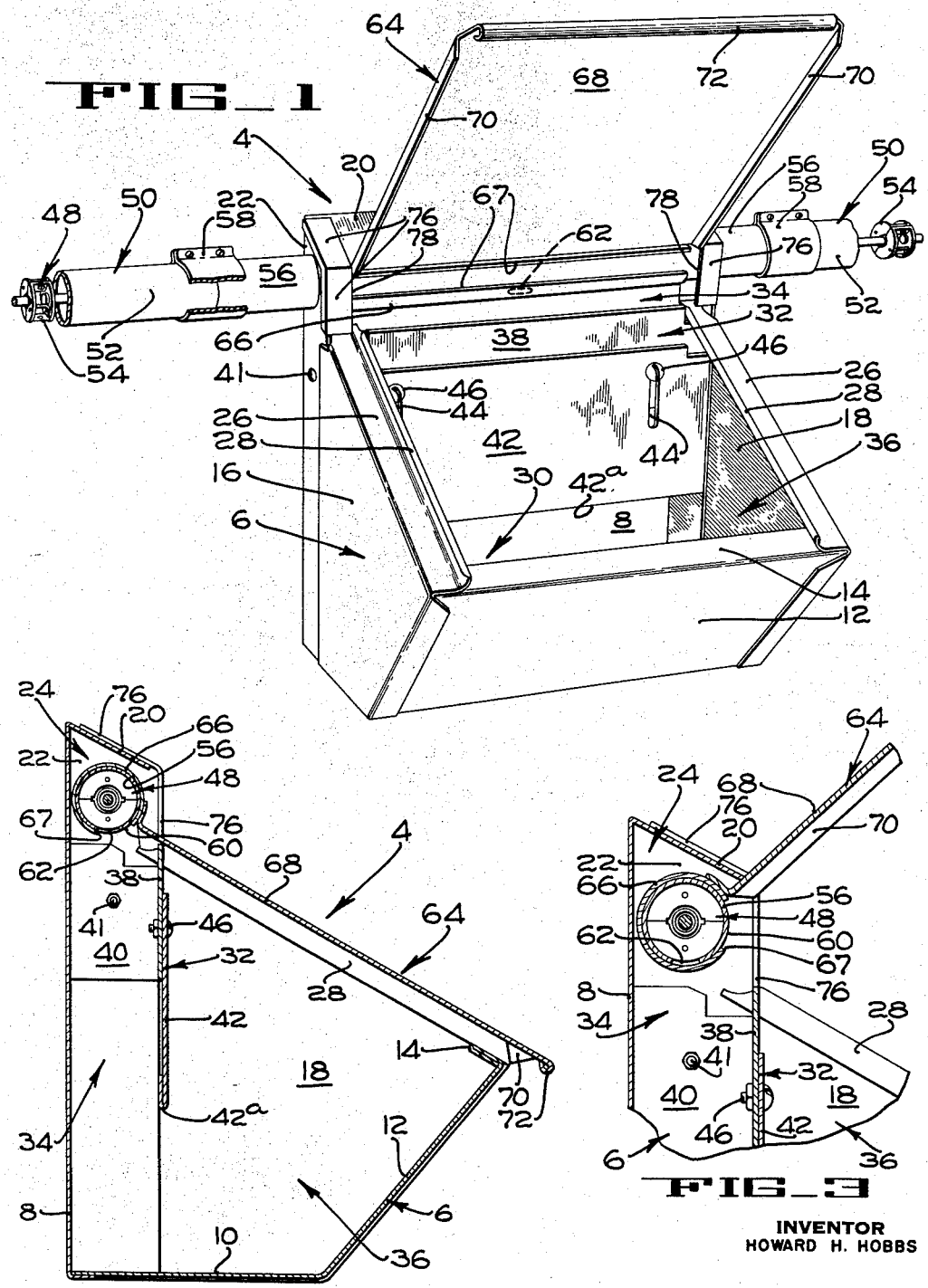

United States Patent Office 2,914,024
Patented Nov. 24, 1959

2,914,024

ANIMAL FEEDING APPARATUS

Howard H. Hobbs, Tipton, Ind., assignor to Food Machinery and Chemical Corporation, San Jose, Calif., a corporation of Delaware Application July 16, 1957, Serial No. 672,254

11 Claims. (Cl. 119—54)

The present invention relates to animal feeding apparatus and pertains more particularly to individual feeders of the type adapted to be supplied with feed by a single conveyor system.

It is an object of the present invention to provide an improved animal feeder.

Another object is to provide an improved mechanism for delivering food to the individual feeders of the apparatus from a remotely located supply of food.

Another object of the present apparatus is to provide means for protecting the animals' food from contamination by dirt and the effects of weather, particularly when the feeders are not in use by animals.

Another object is to provide means for conserving the supply of food in the feeder of the present invention.

Another object of the present feeding apparatus is to provide a mechanism for stopping the delivery of food to each of the feeders when a predetermined amount of food has been accumulated therein.

Another object is to provide a control device that is effective to permit delivery of food into the individual feeders of the apparatus of the present invention only when the animals are not feeding therefrom.

These and other objects and advantages of the present invention will become apparent from the following description taken in connection with the accompanying drawings, in which:

Fig. 1 is a fragmentary perspective showing an individual feeder of the apparatus of the present invention, with its lid in open position.

Fig. 2 is a vertical, transverse section taken centrally of the apparatus shown in Fig. 1, with its lid in closed position.

Fig. 3 is an enlarged fragmentary section, similar to Fig. 2, but showing the parts thereof in the same condition as in Fig. 1.

Referring to Figs. 1 and 2, the feeder 4 of the present animal feeding apparatus is in the form of a bin or receptacle and comprises a body 6 which may be fabricated of corrosion-resistant sheet metal. When in use, the feeder 4 may be supported in any suitable manner, at a height convenient for relatively large animals and with a back panel 8 of the feeder body 6 lying flat against a vertical wall or partition of a pen (not shown). The feeder body 6 is provided with an amply proportioned bottom panel 10 so that the feeder 4 can rest upon the floor of the pen (not shown) when the feeder is to be used by small animals. Still another panel 12, having an inturned upper edge 14, projects from the front edge of the bottom 10 in a forward and upward direction. Opposite ends of the feeder body 6 are closed by end walls 16 and 18. For a purpose to be made clear hereinafter, the distance between the opposite end walls 16 and 18 of the feeder is calculated to permit the head of only one animal to enter the feeder at a time.

The upper edge of the back panel 8 is provided with a forwardly and downwardly inclined ledge 20. On each of the end walls 16 and 18 (Figs. 2 and 3) is an upwardly extending, tongue-like wall projection 22 which, in conjunction with the ledge 20 and the back panel 8, define a narrow, elongated conveyor chamber 24 that projects upwardly of the main part of the body 6 and extends longitudinally of the feeder. It will be noted that the conveyor chamber 24 is located at the rear of the feeder 4 and is disposed well above the upper inturned edge 14 of the inclined front panel 12.

The end walls 16 and 18 are suitably secured to the integrally formed panels 8, 10 and 12, and the ledge 20 of the feeder body 6 in any convenient manner. Each of the end walls is provided along its upper edge with a flange 26 projecting inwardly of the body 6 and having an upwardly extending lip 28 along its inner edge. It will be noted that the flanges 26 (Fig. 1) extend downwardly from a point interiorly of the conveyor chamber 24 beneath the forward edge of the ledge 20, to a point over the inturned edge 14 at the top of the front panel 12. In Fig. 1 it is apparent that the oppositely disposed flanges 26 and the inturned edge 14 define three sides of an access opening 30 in the body 6. From the foregoing description it will be understood that the shape of the body 6 is such that a supply of food may be retained therein for animals which are confined in the previously mentioned pen (not shown).

A vertical wall or partition 32 (Fig. 2), which is disposed longitudinally of the feeder body 6, serves to divide the space within the body into a storage compartment 34 which is located at the rear of the feeder and a feeding compartment 36, located at the front of the body. The partition comprises an elongated strip or plate 38 having flanged ends 40 which are affixed to the opposite end walls 16 and 18 by bolts 41 so that the strip extends in a fixed position between the walls. A vertically disposed control plate 42, of rigid material, is secured to the strip 38 and extends end-to-end of the body 6. The control plate 42 is provided with vertically extending slots 44 (Fig. 1) adjacent its opposite ends through which suitable bolts 46 extend that are disposed in the strip 38. By manipulation of the bolts 46, which retain the plate in any position of vertical adjustment, the plate can be moved so that the distance between the lower edge 42a thereof and the bottom panel 10 of the feeder may be varied so as to have a regulating effect upon the amount of feed in the compartment 36.

The feeder 4 of the present invention is used in conjunction with a conveyor system of the endless conveyor type. In the instance of the present invention, an endless chain 48 of a conveyor 50 delivers food of an appropriate type from a supply hopper (not shown) through a tube 52 to the feeder 4. The feeder 4 is only one of a plurality of individual animal feeders which may be employed with a single conveyor 50 that is effective to deliver food to all of the feeders. It is to be particularly noted that the feeders 4 of a single system may be located in one or in a plurality of pens. The food is advanced in the tube 52 by spools 54 which are provided at intervals on the chain 48 and which act as conveyor flights for advancing the food along the tube 52 to the feeders.

The body 6 of the feeder is provided with a length of cylindrical conduit 56 through which the endless conveyor chain 48 passes. The conduit 56 extends a limited distance beyond the opposite end walls 16 and 18 of the body 6 (Fig. 1). If a plurality of feeders 4 are to be grouped in side-by-side relation to form a multi-feeder unit (not shown), short lengths of supply conduit 52 can be connected by clamps 58 to the ends of the conduit 56 of adjacent units. If desired, the body portions 6 of the feeder may be made without a conduit 56 and then, if a multiple unit system is desired, a single long conduit can be used to connect all the body portions 6 of the units in relatively close side-by-side relation.

The conduit 56 is disposed longitudinally of the feeder body 6 in suitable apertures 60 (Figs. 2 and 3) that are provided in the projections 22 of the end walls 16 and 18 and in which the conduit is secured as by welding to the walls. When positioned in the above-described manner, the part of the conduit 56 that is located within the body 6 is disposed in the conveyor chamber 24 immediately at the rear of the access opening 30 and extends wholly in sheltered relation below the ledge 20 closely adjacent the top edge of the strip 38. A slot 62 (Figs. 2 and 3), which serves as a passage through which food enters the feeder from the conveyor, is formed in the wall of the conduit 56 and is located midway between the end walls 16 and 18. The slot has been found to give satisfactory results if it is made substantially twice as long as it is wide. When the conveyor 50 is in operation and feed is being advanced along the tube 52 and along the conduit 56 to the feeders, feed will fall from the conduit through the passage 62 and into the compartment 34 at the rear of each feeder. With the conduit located in the above-described manner, any food that is delivered to a feeder 4 by the conveyor 50 is discharged therefrom through a passage 62 and into the storage compartment 34 at a location between the partition 32 and the rear panel 8 of the body 6.

Each feeder of the present apparatus is provided with a lid 64 for closing the access opening 30 in the body 6 when the feeder is not being used by an animal. The lid 64 is fabricated of material similar to that of the body 6 and has a cylindrical sleeve 66 at its inner end. The sleeve, which is of semicylindrical configuration has a slot 67 extending along its entire length and encircles the conduit 56 so that the conduit serves as a fixed spindle about which the sleeve can freely pivot when the lid is moved during opening and closing of the feeder opening 30. A generally flat portion 68 of the lid extends radially of the sleeve 66 (Fig. 2). The width of the flat portion 68 (Fig. 1) of the lid exceeds the distance between the lips 28 which are disposed at the opposite sides of the opening 30. In order to prevent water, which may fall upon the feeder when the access opening 30 is closed by the lid, from entry into the body 6, the lateral edges of the lid are flanged providing narrow, downturned lips 70 therealong. As will be understood from Fig. 1, when the lid 64 is in closed position over the opening 30 (Fig. 2), the lips 70 thereof are disposed laterally of the opening 30 exteriorly of the lips 28 on the body 6. With this arrangement, water such as rain, which falls either upon the closed lid 64 and from there drains onto the flanges 26 or falls directly upon the flanges 26, is diverted away from entry of the feeder by the combined action of the lips 70 and 28 of the lid and body, respectively. As previously mentioned, the flanges 26 extend toward the rear of the feeder onto the conveyor chamber 24 of the body 6 beneath the lower, front edge of the ledge 20. The overlapping relationship of the ledge 20 with respect to the upper ends of the flanges 26 further serves to protect the interior of the feeder from entry of rain which may fall upon the ledge 20 and will flow from there onto the lid and flanges. Such rain or moisture will descend from the sharply declined ledge 20 onto both the lid 64 and the flanges 26 therebelow and be shed in a manner previously described.

The terminal edge of the lid 64 (Figs. 1 and 2) overhangs the panel 12 and is rolled so as to provide a smooth bead 72 therealong. An animal, such as a hog desiring food, will engage the bead 72 by means of his snout and raise the lid until the lid abuts the ledge 20. The ledge 20 acts as a stop to effectively limit the upward movement of the lid, thereby assuring that the lid will return to closed position under its own weight when the animal withdraws his head from below the same.

Several advantages derive from the fact that the delivery of food by the conveyor 50 to the feeder is positively cut off during the time the feeder is in use by an animal. It has been discovered that considerable loss of food is caused by the animal's inherent tendency to seek more desirable food pieces as well as to push the food toward the sides of the feeding compartment 36 as he eats. Because of this tendency, when the compartment is provided with an oversupply of food, some of the food will be pushed out of the feeder over the sides thereof. If, however, the supply of food available in the feeder body 6 at a given time is limited, its consumption will be more complete than would otherwise be possible, and there will be far less tendency for the animal to waste the food by pushing it out of the feeder.

Referring particularly to Fig. 2 in which the feeder lid 64 is shown in lowered position closing the opening 30, it is apparent that the slot 67 of the sleeve 66 is in registry with the passage 62 so that the entry of food from the conveyor 50 through the passage 62 and into the compartment 34 is unrestricted. With this arrangement, the sleeve 66 acts as a valve for controlling the flow of feed through passage 62 as the sleeve 66 is moved by the lid which acts as an actuator for the valve. It is to be understood that the top of the fixed strip 38 of the partition 32 is disposed at such a height in relation to the location of the passage 62 that the food which builds up in the compartment from the conveyor 50 will accumulate in the compartment until the height of food therein will block the entry of additional food through the passage 62. By means of the construction of the feeder 4, previously described, food is delivered into the compartment 34 by means of the conveyor 50, and the food in the compartment 34 can enter the feeding compartment 36 only through the space below the control plate 42. When the animal is eating from the feeder and the lid 64 is raised (Fig. 3), the slot 67 is moved out of registry with the opening 62 so that no food can enter the compartment. Conversely, food can be supplied to the feeder from the conveyor 50 only when the lid 64 is closed (Fig. 2) and the slot 67 in the sleeve 66 is in registry with the opening 62. Therefore, when the lid is raised, only the supply of food that was in the bin before the lid was raised is available to an animal.

The projections 22 on the end walls 16 and 18 are provided, along their front and top edges, with inturned flanges 76 which serves to guide the lid between closed position and open position so as to prevent lateral movement thereof. The guide flanges 76 start at the rear of the end walls, extend across the top of the projections 22 and down the front thereof to a point spaced slightly above the flanges 26, as shown best in Fig. 1. The purpose of providing space between the lower ends of the guide flanges 76 and the opening defining flanges 26 is so that water which may fall onto the flanges 26, from the ledge 20 rearwardly of the guides 76, can flow without obstruction down the flanges 26 as hereinbefore described. The guide flanges 76 project toward each other and engage the opposite lips 70 of the lid 64 with their innermost edges 78 (Fig. 1).

After a short period of use, it is possible to determine the effect that an animal's feeding habits have upon the amount of food normally retained in the feeding compartment 36. Thereafter, suitable adjustment in the height of the control plate 42 above the feeder bottom 10 may be made in a manner previously described. By proper control of the amount of food in the feeding compartment 36 through properly positioning the control plate 42 the amount of food that will be pushed out of the feeder over the sides as the animal eats can be controlled. Both the inturned front edge 14 as well as the side flanges 26 that are disposed about a portion of the access opening 30 aid in the conserving effect that the present feeder has upon the supply of food therein.

Assuming now that an animal wishes to eat, he will, by the use of his snout engage the bead 72 on the overhanging front edge of the lid or valve actuator 64, and raise the same into the position shown in Figs. 1 and 3.

With the lid in this position, the animal may then put his head far enough over the body 6 of the feeder so that his mouth may enter the feeding compartment through the opening 30. When the lid is in the raised position, the sleeve 66 thereof has been rotated on the conduit 56 so that the slot 67 of the sleeve has been moved in a counterclockwise direction out of registry with the passage 62 of the conduit 56 and into the position of Fig. 3. When the slot 67 is in the Fig. 3 position, the wall of the sleeve 66 blocks any possible delivery of food from the conveyor 50 into the food storage compartment 34. It is readily apparent then that, when the lid 64 is raised, the animal has at his disposal the food in the compartment 36 as well as the food in the compartment 34. As the animal consumes the supply of food in the compartment 36, the reserve supply in the compartment 34 lowers as it moves by gravity below the control plate 42 and into the feeding compartment. If a particular animal, because of his peculiar eating habits, should empty the feeder through waste of food during one eating period, the amount he can waste at a given time is limited by the immediate supply of food in the feeder. Because of this feature animals eating from the feeder of the present invention tend to waste less of their food than would otherwise be the case. Additional food is delivered to the feeder only after the animal has withdrawn his head from below the lid and the lid acting as an upwardly yieldable control means for the valve is lowered, by virtue of its own weight.

Additionally, the novel arrangement of the present feeder wherein the conduit 56 is located high in the compartment 34 and is widely separated from the food in the feeding compartment 36 which, in turn, is separated from the bin by the partition 32, has positive advantages to livestock producers. By means of this arrangement, no food which an animal has touched in one feeder can ever be conveyed to another feeder served by the common conveyor 50. Since only one animal at a time can eat from a single feeder and only clean, uncontaminated food is delivered to each feeder served by a conveyor of the apparatus of the present invention, it is evident that the spread of disease will not be caused by the present feeders.

It will be understood that modifications and variations of the disclosed embodiment of the present invention may be resorted to without departing from the scope of the novel concepts of the invention.

Having thus described the invention, what is claimed as new and desired to protect by Letters Patent is:

1. In an animal feeding apparatus, a feed bin, means associated with said bin providing a passage arranged to conduct food into said bin, control means operatively associated with said passage and arranged to be moved from passage opening position to a position blocking the entry of food through said passage into said bin, and an actuator connected to said control means and adapted to be engaged and actuated by an animal gaining access to said bin and arranged upon each such actuation to move said control means into blocking position with respect to said passage.

2. In an animal feeding apparatus, a bin having an access opening, means associated with said bin providing a food delivery passage communicating with the interior of said bin for directing food into said bin, a lid pivotally mounted on said bin and movable from an open position to a position closing said access opening, and valve means operatively associated with said food delivery passage and movable by said lid into a position blocking entry of food into said bin through said passage upon movement of said lid into open position by an animal.

3. In an animal feeding apparatus, a bin, a partition adjustably mounted in said bin in spaced relation above a bottom wall thereof and extending across the interior of said bin to define therein a food storage compartment and a feeding compartment, said bin having an access opening into said feeding compartment at one side of said partition, a food delivery conveyor extending into said storage compartment at the other side of said partition and arranged to supply food to said compartment, a lid pivotally mounted in said bin and movable between an open position and a position closing said access opening, valve means associated with said conveyor and operable by said lid for movement into a position to block entry of food into said storage compartment from said conveyor upon movement of said lid into open position by an animal gaining access to said feeding compartment, and a ledge on said bin extending in sheltering relation over said storage compartment and over said conveyor.

4. In an animal feeding apparatus, a bin having a bottom wall, a partition adjustably mounted in said bin in spaced relation above said bottom wall thereof and extending across the interior of said bin to define a food storage compartment and a feeding compartment, said bin having an access opening into said feeding compartment, flanges on opposite end walls of said bin projecting inwardly of said feeding compartment and defining two opposite sides of the access opening in said bin, means providing a food delivery passage opening into said food storage compartment and arranged to direct food into said storage compartment, a lid for said access opening pivotally mounted on said bin in said storage compartment and normally urged into a position closing said access opening, valve means operably associated with said food delivery passage and arranged for movement into a position closing said passage to block entry of feed into said storage compartment through said passage upon engagement of said lid by an animal raising said lid preparatory to eating from said feeding compartment, and a ledge on said bin extending in sheltering relation over said storage compartment, said conveyor and the pivotal mounting of said lid.

5. In an animal feeder, a body with an access opening therein, a fixed tubular spindle extending between opposite sides of said body and having a passage therein communicating the interior of said spindle with the interior of said body, a lid pivotally mounted on said spindle for movement between a position closing said access opening and a position spaced from said opening, a control member operably associated with said lid and movable thereby to a position closing the inlet passage in said spindle when said lid is moved to a position spaced from said opening, and means within said spindle arranged to move feed through said spindle past said inlet passage.

6. In an animal feeder having a body with an access opening therein, inwardly directed flanges on said body at two opposite sides of an bordering said opening, a ledge on said body above and extending across the adjacent ends of said flanges at another side of said access opening, a spindle fixed in said body and extending between opposite sides thereof in sheltered relation below said ledge, a lid adapted to engage said flanges and close said access opening, and a sleeve attached to said lid adjacent one end and pivotally mounted on said spindle and arranged to movable mount said lid on said body.

7. In combination in an animal feeder having a body including a bottom wall, a cylindrical member extending into said body in spaced relation over the bottom wall thereof, means providing a passage in said cylindrical member and communicating said cylindrical member with the interior of said body, a semicylindrical sleeve received about said cylindrical member for free rotary movement thereon, said sleeve having a valve portion movable between a position blocking said passage and a position opening said passage when said sleeve is rotated, and means movable by an animal in one direction for moving said sleeve to one of said positions thereof, said sleeve moving means being movable by gravity in another direction to return the sleeve to the other of said positions thereof.

8. In an animal feeder, a bin having a bottom wall, a tubular member extending across the interior of said bin in spaced relation above the bottom wall, means providing a passage in the wall of said tubular member and adapted to establish communication between the interior of said tubular member and the interior of said bin, a semicylindrical sleeve received about said tubular member and arranged for free rotary movement thereon, said sleeve having a portion movable into and out of passage blocking position during rotation of said sleeve, yieldable means connected with said sleeve and arranged to urge said sleeve toward passage opening position, and stop means on said bin arranged to limit the movement of said sleeve when the same is moved by said yieldable means in a passage blocking direction.

9. In an animal feeding apparatus, a bin having a bottom wall, a partition in said bin defining therein a food storage compartment and a feeding compartment, said partition being disposed in spaced relation with respect to the bottom wall of said bin and arranged to control entry of food into said feeding compartment from said storage compartment, a conveyor tube extending through said bin and having a discharge passage arranged to direct food from said conveyor to said storage compartment, control means in said storage compartment and arranged to be moved from passage-opening position into passage-closing position for blocking entry of food into said storage compartment form said conveyor, an actuator for said control means adapted to be engaged and moved by an animal while gaining access to said feeding compartment and arranged upon each such movement to move said control means into blocking position with respect to said passage, and guide means on said bin adapted to engage the marginal edges of said control actuator and guide said actuator during movement of said control means into and out of blocking position relative to said conveyor discharge passage.

10. In an animal feeding apparatus, a bin having a bottom wall, a partition in said bin defining a food storage compartment and a feeding compartment, said partition being arranged to control entry of food into said feeding compartment from said storage compartment, a conveyor housing extending into said bin and having a discharge passage arranged to conduct food from within said conveyor housing into said storage compartment, control means in said storage compartment and arranged to be moved into a position to close said passage for blocking entry of food therethrough, an actuator for said control means adapted to be engaged and moved by an animal while gaining access to said feeding compartment, guide means on said bin adapted to engage said control actuator and guide the same during movement of said control means into and out of passage blocking position, and stop means on said bin arranged to limit the movement of said actuator in one direction.

11. In an animal feeder, means defining a food storage compartment, a wall at one side of said compartment having a bottom edge located in spaced relation above the bottom of said compartment and arranged to permit the movement of food below the bottom edge of said wall and out of said storage compartment, food delivery means extending into said compartment in spaced relation above the bottom thereof and providing a passage in communication with said storage compartment, valve means operatively associated with said food delivery means and arranged to be moved into and out of passage blocking position, and an actuator connected to said valve means and engageable by an animal eating from said feeder to move said valve means from passage-open to passage-closed position.

References Cited in the file of this patent

UNITED STATES PATENTS

| | | |
|---|---|---|
| 1,719,245 | Smidley | July 2, 1929 |
| 1,881,820 | McCollough et al. | Oct. 11, 1932 |
| 2,509,946 | Thornton | May 30, 1950 |
| 2,738,765 | Hart | Mar. 20, 1956 |
| 2,793,615 | Kerkvliet | May 28, 1957 |

FOREIGN PATENTS

| | | |
|---|---|---|
| 693,013 | Great Britain | June 17, 1953 |